US011072539B2

(12) United States Patent
Lee et al.

(10) Patent No.: US 11,072,539 B2
(45) Date of Patent: Jul. 27, 2021

(54) WATER PURIFIER

(71) Applicant: LG Electronics Inc., Seoul (KR)

(72) Inventors: Heejun Lee, Seoul (KR); Kyelyong Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/230,867

(22) Filed: Dec. 21, 2018

(65) Prior Publication Data

US 2019/0194033 A1 Jun. 27, 2019

(30) Foreign Application Priority Data

Dec. 22, 2017 (KR) .......................... 10-2017-0178734

(51) Int. Cl.
*C02F 1/00* (2006.01)
*B01D 35/147* (2006.01)
(Continued)

(52) U.S. Cl.
CPC .......... *C02F 1/003* (2013.01); *B01D 35/1475* (2013.01); *B01D 35/1573* (2013.01);
(Continued)

(58) Field of Classification Search
CPC ...... C02F 1/003; C02F 1/008; C02F 2209/02; C02F 2201/005; C02F 2307/10;
(Continued)

(56) References Cited

U.S. PATENT DOCUMENTS 4,978,833 A * 12/1990 Knepler ................. F24H 1/202
                                                    392/402
5,277,828 A *  1/1994 Fleming ................. B01D 24/08
                                                    210/134
(Continued)

FOREIGN PATENT DOCUMENTS

JP       2000241022        9/2000
KR    20110096868 A   *  8/2011    ............. B01D 35/00
(Continued)

OTHER PUBLICATIONS

Australian Examination Report in Australian Application No. 2018282380, dated Apr. 18, 2019, 5 pages.

*Primary Examiner* — Nam X Nguyen
*Assistant Examiner* — Ekandra S. Miller-Cruz
(74) *Attorney, Agent, or Firm* — Fish & Richardson P.C.

(57) ABSTRACT

A water purifier includes a water supply tube into which water is introduced, a filter member purifying water passing through the water supply tube, a water discharge tube supplying water to the outside of the water purifier, a hot water tube branched from the water discharge tube, a hot water module including a hot water tank provided on the hot water tube to accommodate purified water and a heat generation unit heating the water accommodated in the hot water tank, a controller spaced apart from the hot water tank or the heat generation unit to control the heat generation unit, and a water discharge nozzle supplying the water passing through the water discharge tube and the hot water tube to the outside of the water purifier. At least a portion of (Continued)

the hot water tube or the water discharge tube passes through the controller and is heat-exchanged with the controller.

20 Claims, 9 Drawing Sheets

(51) Int. Cl.
    *B01D 35/157*     (2006.01)
    *B01D 35/18*     (2006.01)
    *C02F 9/00*     (2006.01)

(52) U.S. Cl.
    CPC .............. *B01D 35/18* (2013.01); *C02F 1/008* (2013.01); *C02F 9/005* (2013.01); *C02F 1/001* (2013.01); *C02F 2201/005* (2013.01); *C02F 2209/005* (2013.01); *C02F 2209/02* (2013.01); *C02F 2209/40* (2013.01); *C02F 2307/10* (2013.01)

(58) Field of Classification Search
    CPC . C02F 2209/04; B01D 35/1573; B01D 35/18; B01D 35/1475
    USPC .......................................................... 210/149
    See application file for complete search history.

(56) References Cited

U.S. PATENT DOCUMENTS

| | | | |
|---|---|---|---|
| 8,767,401 B2 * | 7/2014 | Kim | H05K 7/20909 |
| | | | 361/697 |
| 2010/0250449 A1 * | 9/2010 | Doyle | C02F 1/4674 |
| | | | 705/302 |
| 2013/0104586 A1 | 5/2013 | Krause et al. | |
| 2015/0008473 A1 * | 1/2015 | Lee | F21V 29/713 |
| | | | 257/99 |
| 2015/0225226 A1 * | 8/2015 | You | B67D 1/0014 |
| | | | 222/54 |
| 2017/0319990 A1 | 11/2017 | Jeon et al. | |

FOREIGN PATENT DOCUMENTS

| | | | | |
|---|---|---|---|---|
| KR | 1020120011924 | | 2/2012 | |
| KR | 20130027545 A | * | 3/2013 | ............ F25D 19/00 |
| KR | 10-1308124 | | 9/2013 | |
| KR | 101308124 B1 | * | 9/2013 | ............ B01D 35/00 |
| KR | 1020140057420 | | 5/2014 | |
| KR | 1020150141038 | | 12/2015 | |
| WO | WO2004034742 A1 | * | 4/2004 | ............ H05B 1/02 |
| WO | WO-2015199382 | * | 12/2015 | ............ H05B 1/02 |
| WO | WO2017124191 A1 | * | 1/2017 | ............ B01J 19/24 |

* cited by examiner

WATER PURIFIER

CROSS-REFERENCE TO RELATED APPLICATIONS

The present application claims priority under 35 U.S.C. 119 and 35 U.S.C. 365 to Korean Patent Application No. 10-2017-0178734, filed on Dec. 22, 2017, which is hereby incorporated by reference in its entirety.

BACKGROUND

The present disclosure relates to a water purifier.

In general, water purifiers are devices that filter water supplied from a water supply source by using physical and chemical methods to remove impurities and then supply the purified water.

Water purifiers may be classified into natural filtration-type water purifiers, direct filtration-type water purifiers, ion exchange resin-type water purifiers, distillation-type water purifiers, reverse osmotic pressure-type water purifiers, and the like according to purification principles or manners.

Also, water purifiers are classified into storage-type water purifiers in which water purified by passing through a filter is stored in a water tank and then discharged after being heated or cooled and direct-type water purifiers in which water purified by passing through a filter without a water storage tank is heated or cooled and then discharged.

For example, in case of a water purifier having a hot water discharge function, a passage is formed so that hot water passing through a filter passes through a hot water module to generate hot water, and the generated hot water is supplied to the outside of the water purifier through a water discharge nozzle.

However, the water purifier having the hot water discharge function has to be essentially provided with a heat dissipation unit for solving heat generation of a controller that controls an outlet of the heat dissipation unit (for example, a working coil) provided in the hot water module.

However, according to the related art, the heat dissipation unit for solving the heat generation of the controller for controlling the hot water module provided in the water purifier is not provided, and thus, the controller may be deteriorated in performance, and safety may be deteriorated.

Also, even though the heat dissipation unit is provided, there is a limitation that the heat dissipation is not completely performed because the heat dissipation depends on natural cooling and air cooling.

In addition, there is a limitation that it is difficult to mount the separate heat dissipation unit in the miniaturized water purifier.

SUMMARY

Embodiments provide a water purifier in which heat generated in a controller is dissipated through a simple manner in which a passage is disposed so that at least a portion of raw water or purified water before being introduced into a hot water tank passes through the controller, and the raw water supplied into a hot water tank preheats the raw water.

Embodiments also provide a water purifier in which raw water or purifier water introduced into a hot water tank is preheated to minimize a different between a water outlet temperature and a water inlet temperature with respect to a hot water tank, thereby efficiently generating hot water.

Embodiments also provide a water purifier in which heat generated in a controller is easily dissipated through only a simple operation of changing a passage of the water purifier produced in the past, and raw water supplied into a hot water tank is preheated.

Embodiments also provide a water purifier in which heat dissipation of a controller is performed in a water cooling type to more surely dissipate the heat.

Embodiments also provide a water purifier in which a space utilization is advantageous because a separate heat dissipation unit such as a blowing fan is not provided, and the water purifier is minimized.

Embodiments also provide a water purifier in which heat generated in a controller remains in the water purifier or is not dissipated to the outside of the water purifier to prevent a safety accident from occurring.

Embodiments also provide a water purifier in which since heat generated in a controller is not discarded into the atmosphere, but is used to preheat raw water, it is advantageous in view of energy efficiency.

In one embodiment, a water purifier includes: a water supply tube into which raw water is introduced; a filter member purifying the water passing through the water supply tube; a water discharge tube supplying the water passing through the filter member to the outside of the water purifier; a hot water tube branched from the water discharge tube; a hot water module including a hot water tank provided on the hot water tube to accommodate purified water passing through the filter member and a heat generation unit heating the water accommodated in the hot water tank; a controller disposed to be spaced apart from the hot water tank or the heat generation unit to control the heat generation unit; and a water discharge nozzle supplying the water passing through the water discharge tube and the hot water tube to the outside of the water purifier, wherein at least a portion of the hot water tube or the water discharge tube passes through the controller and is heat-exchanged with the controller.

The hot water tube may include: a water inlet part which is branched from the water discharge tube and into which the purified water is introduced; a heat exchange part connected to the water inlet part and provided to pass through the controller; a connection part connecting the heat exchange part to the hot water tank; and a water outlet part transferring the hot water discharged from the hot water tank to the water discharge nozzle.

The water inlet part and the connection part may be disposed to be spaced apart from each other in parallel to each other.

The heat exchange part may include a bent section having a shape that is bent in an arch shape, may be primarily heat-exchanged with the controller while flowing from one side to the other side, and may be secondarily heat-exchanged with the controller while flowing from the other side to one side after passing through the bent section.

The water purifier may further include a heat transfer member transferring heat of the controller to the heat exchange part while coming into surface contact with the controller and the heat exchange part.

The heat exchange member may include: a first heat transfer member having one surface coming into surface contact with the controller and the other surface with an accommodation groove in which a portion of the heat exchange part is accommodated; and a second heat transfer member having one surface with an accommodation groove in which the rest portion of the heat exchange part is accommodated and coupled to the first heat transfer member.

An adhesion layer may be disposed between the heat transfer member and the controller.

The controller may include at least one of an insulated gate bipolar transistor (IGBT) and a diode bridge.

The details of one or more embodiments are set forth in the accompanying drawings and the description below. Other features will be apparent from the description and drawings, and from the claims.

DETAILED DESCRIPTION OF THE EMBODIMENTS

Hereinafter, exemplary embodiments will be described in detail with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present invention.

The drawings attached to the following embodiments are embodiments of the scope of the invention, but to facilitate understanding within the scope of the present invention, in the description of the fine portions, the drawings may be expressed differently according to the drawings, and the specific portions may not be displayed according to the drawings, or may be exaggerated according to the drawings.

The present disclosure relates to a water purifier in which raw water supplied from the outside is purified by passing through a filter, and if necessary, the purified water is cooled or heated to be discharged.

Hereinafter, a water purifier according to an embodiment will be described in detail with reference to the accompanying drawings.

Figure 1:
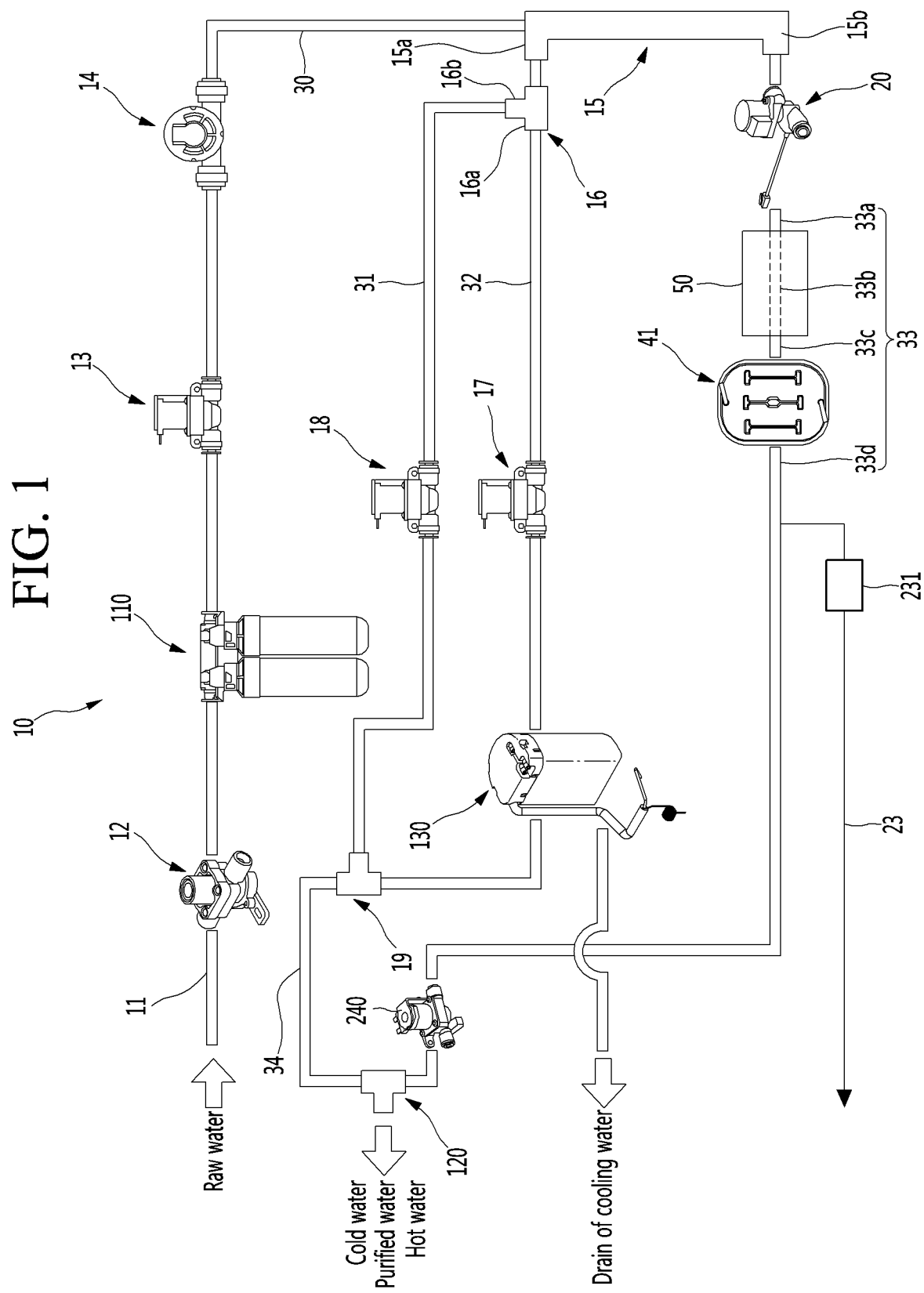
FIG. 1 is a view illustrating a water tube of a water purifier according to an embodiment.

FIG. 1 is a view illustrating a water tube of a water purifier according to an embodiment.

Referring to FIG. 1, a water supply tube 11 of a water purifier 10 is connected to a water supply or the like to receive raw water. The water supply tube 11 is connected to a pressure reducing valve 12, and the raw water passing through the pressure reducing valve 12 is decompressed to a preset pressure for the operation of the water purifier 10.

Also, the decompressed raw water flows to a filter member 110 through a tube connecting the pressure reducing valve 12 to the filter 110. Foreign substances contained in the raw water may be removed while passing through the filter member 110, and thus, the water may be purified. Also, a water supply valve 13 may be opened to allow the purified water to sequentially pass through the water supply valve 13 and a flow rate sensor 14 along a water discharge tube 30.

Here, the water supply valve 13 and the flow rate sensor 14 may be connected to a main PCB (not shown) including a controller 50. A degree of opening of the water supply valve 13 may be adjusted according to a signal transmitted to the main PCB (not shown). Also, information with respect to a flow rate detected by the flow rate sensor 14 may be transmitted to the main PCB (not shown) and used as data for controlling the water purifier.

The purified water passing through the flow rate sensor 14 may be branched into a cold and purified water side 15a and a hot water side 15b through a branch tube 15.

Also, the purified water branched to the cold and purified water side is branched again into a cold water side 16a and a purified water side 16b by a T connector 16 to respectively flow to the purified water tube 31 and the cold water tube 32. A cold water discharge valve 17 and a purified water discharge valve 18 are installed in the purified water tube 31 and the cold water tube 32, respectively. The purified water discharge valve 18 and the cold water discharge valve 17 may be connected to the main PCB (not shown) and thus be opened or closed by the control of the main PCB (not shown). The purified water discharge valve 18 and the cold water discharge valve 17 may be selected by user's setting. A water discharge button 420 disposed on the outside of the water purifier may be manipulated to open the selected valve and dispense water.

Here, the water passing through the cold water tube 32 connected to the cold water side 16a of the T connector 16 and the cold water discharge valve 17 passes through a cooling coil within a cooling tank 130. The water flowing along the cooling coil is heat-exchanged with cooling water within the cooling tank 130 and then cooled. For this, the cooling water may be cooled to be maintained at a preset temperature.

A compressor connected to the main PCB (not shown) may be driven to cool the cooling water. The driving of the compressor may be determined by a cold water temperature sensor provided in the cooling tank 130. Thus, the cooling water may be always maintained at the preset temperature. For this, the driving of the compressor may be controlled. The compressor may be adjusted in frequency to correspond to a load that is required for an inverter compressor and thus adjusted in cooling capacity. That is, the compressor may be driven by an invert control to cool the cooling water with optimal efficiency.

An operation of the compressor may be set in a forcibly turned-off state by manipulating a manipulation part by the user. The compressor may be forcibly maintained in the turn-off state when cold water consumption is low at winter, power saving is required, or the cold water is not desired to be used.

The cold water passing through the cooling tank 130 may be introduced into a purified water supply hose 34 through the T connector 19 and then may pass through the purified water supply hose 34 and be dispensed to the outside through the water discharge nozzle 120.

When the purified water discharge valve 18 is opened, the purified water passing through the purified water tube 31 connected to the purified water side 16b of the T connector 16 and the purified water discharge valve 18 may be introduced into the purified water supply hose 34 through the T connector 19 and then pass through the purified water supply hose 34 and be dispensed to the outside through the water discharge nozzle 120.

The water discharge tube 30 may be constituted by the purified water tube 31 and one tube.

That is, the water discharge tube 30 may be constituted by the purified water tube 21 and one tube, and the cold water tube 32 and the hot water tube 33 may be branched from the water discharge tube 30. Also, the water discharge tube 30 may include all of the purified water tube 31, the cold water tube, 32, and the hot water tube 33.

When the user selects the dispensing of the hot water, the purified water flows to the hot water side 15b of the branch tube 15 and then flow to the hot water tube 33.

Here, a flow rate adjustment valve 20 may be opened by the control of the main PCB (not shown), and water flowing through the hot water tube 33 via the flow rate adjustment valve 20 may be adjusted to an adequate flow rate for heating the hot water. That is, an amount of purified water supplied to the hot water tank 41 may be adjusted so that the water is heated at a preset temperature by the hot water module.

As described above, the purified water passing through the flow rate adjustment valve 20 passes through the hot water tank 41. Also, while passing through the hot water tank 41, the water may be heated at the preset temperature. The hot water tank 41 may be heated in an induction heating manner. For this, an output of magnetic force of a working coil may be adjusted under the control of the controller 50.

To drive the hot water module, a high voltage that is relatively higher than that of the main PCB is required. Thus, to supply the high voltage, power may be supplied from the controller 50 connected to a power line. The controller 50 may supply adequate power according to whether the hot water module is driven, and also, adequate power may be supplied to the main PCB.

The water within the hot water tank 41 may be heated at the preset temperature by driving the hot water module.

The hot water heated while passing through the hot water tank 41 may flow to the water discharge nozzle 120 through a hot water supply hose and then be dispensed to the outside.

Also, an outlet side of the hot water tank 41 may be branched and then further connected to a steam tube 23. The steam tube 23 may discharge steam generated when the water within the hot water tank 41 is boiled. Also, a safety valve 231 is provided in the steam tube 23. When an internal pressure is equal to or greater than a set pressure, the safety valve 231 is opened to discharge steam.

In detail, the safety valve is configured to discharge the steam generated when the hot water is heated in the hot water tank. Thus, the safety valve prevent the inside of the hot water tank from excessively increasing in pressure by the steam. The safety valve 231 may be configured to be opened at the set pressure and have various structures as long as the steam generated in the hot water tank is smoothly discharged. Also, an outlet of the safety valve 231 may be connected to a drain tube extending to the outside of the water purifier 10.

Hereinafter, the 'hot water module' and the 'controller' that are portions of the component according to an embodiment will be described in more detail.

Figure 2:
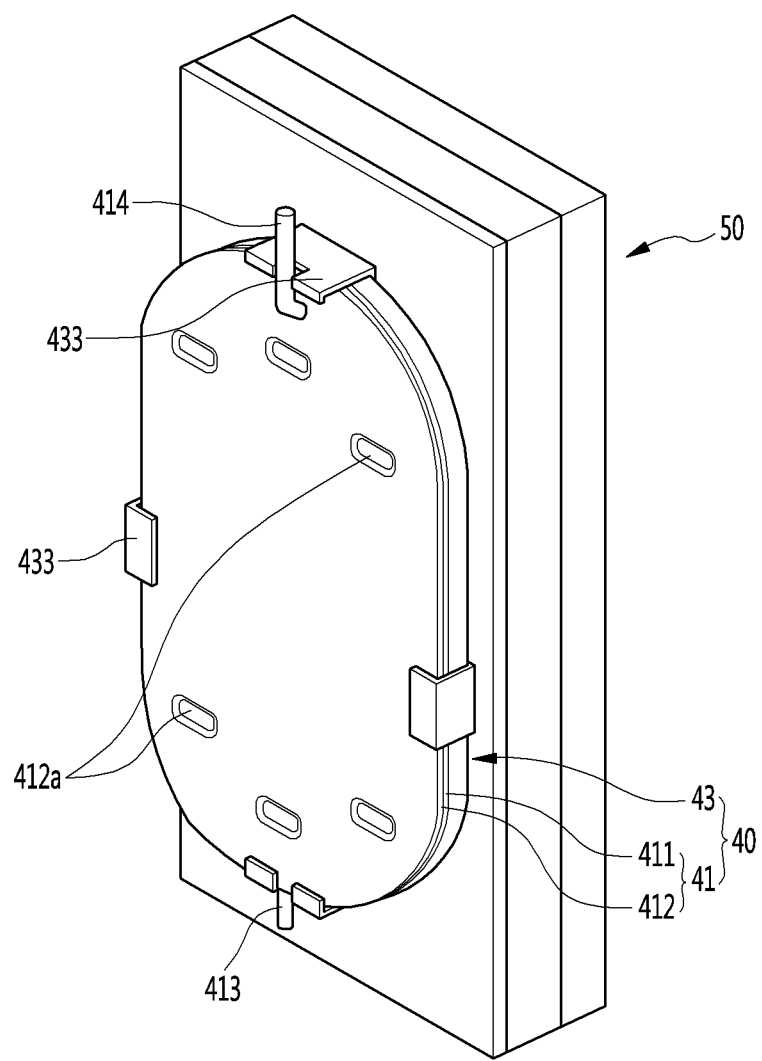
FIG. 2 is a perspective view illustrating an example of the hot water module that is a main component of the water purifier according to an embodiment.
Figure 3:
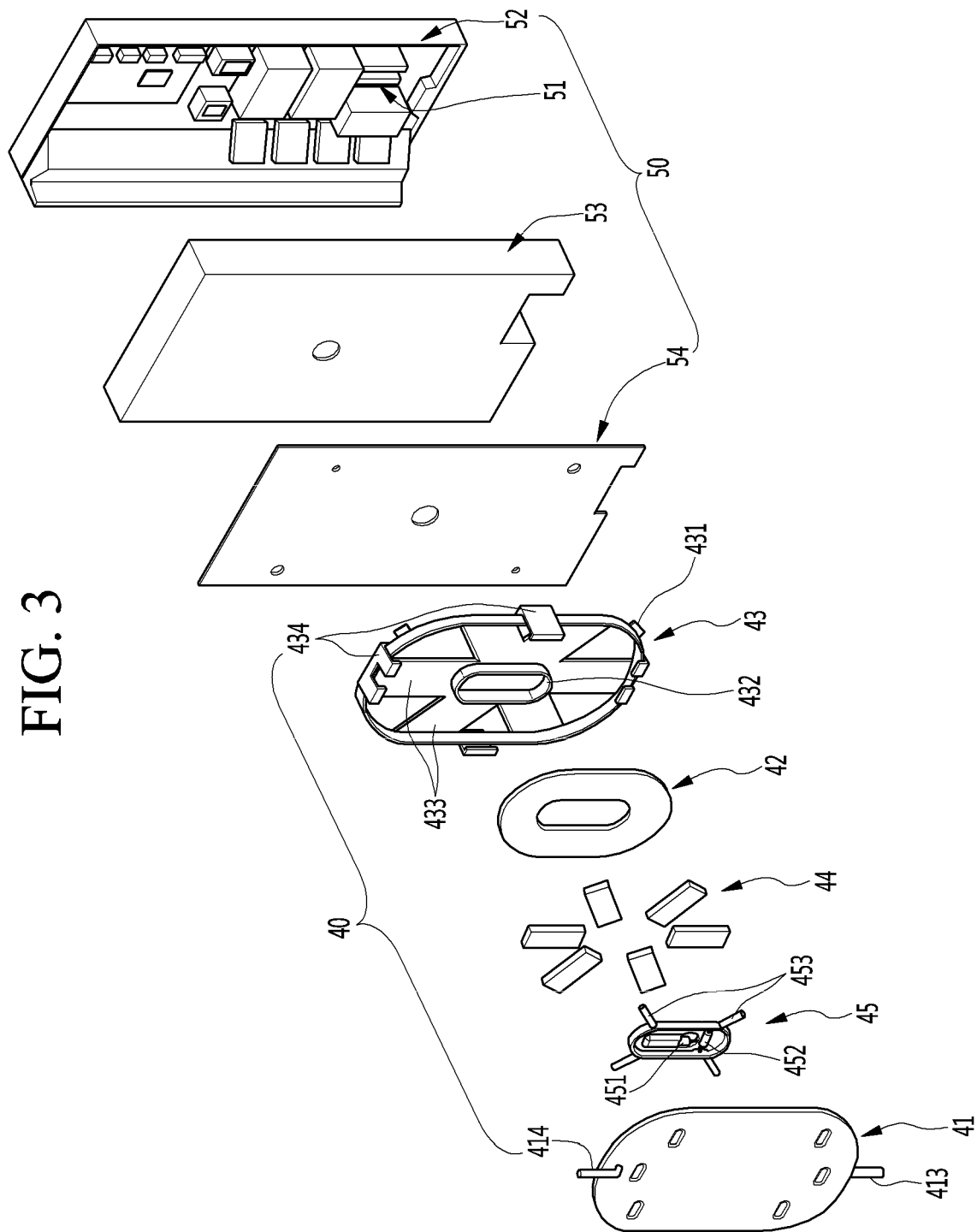
FIG. 3 is an exploded perspective view of the hot water module.

FIG. 2 is a perspective view illustrating an example of the hot water module that is a main component of the water purifier according to an embodiment. Also, FIG. 3 is an exploded perspective view of the hot water module.

As illustrated in the drawings, the hot water module 40 and a controller 50 may be coupled to each other to form one module. Then, the one module may be mounted in the water purifier 10.

The hot water module 40 receives the purified water to heat the purified water and thereby to generate hot water. The hot water module 40 may heat the purified water in an induction heating (IH) manner.

In detail, the hot water module 40 may include a hot water tank 41 through which the purified water passes, a working coil 42 for heating the water passing through the hot water tank 41, and a mounting bracket 43 on which the working coil 42 and the hot water tank 41 are mounted.

The mounting bracket 43 provides a mounting space for the hot water tank 41, the working coil 42, and a ferrite core 44. Also, the mounting bracket 43 may be made of a resin material that is not deformed or damaged at a high temperature.

A bracket coupling part 431 to be coupled to the controller 50 is disposed on an edge of the mounting bracket 43. The bracket coupling part 431 may be provided in plurality. Here, extending ends of the bracket coupling parts 431 may have different shapes and have directionality. Thus, the hot water module 40 may have a structure that is combined with the controller 50, and thus, the hot water module 40 may be mounted at an accurate position.

Also, a bracket mounting part 432 on which a sensor bracket 45 is mounted may be further disposed on a center of one surface of the mounting bracket 43 on which the hot water tank is mounted. A tank temperature sensor 451 and a fuse 452 may be disposed at a center of the bracket mounting part 432.

The tank temperature sensor 451 for measuring a temperature of the hot water tank 41 may be mounted on the sensor bracket 45. The tank temperature sensor 451 may measure a temperature at a center of the hot water tank 41 to determine a temperature of the hot water without directly measuring the temperature of the hot water within the hot water tank 41. Thus, the dispensed hot water may be maintained within an appropriate temperature range by the tank temperature sensor 451. That is, additional heating or heating stop may be determined by the temperature detected by the tank temperature sensor 451.

Also, the fuse 452 may be mounted on the sensor bracket 45. The fuse 452 may interrupt power of the hot water module 40 when water within the hot water tank 41 is excessively heated.

A plurality of coil fixing parts 453 may be disposed on a circumference of the sensor bracket 45. Each of the coil fixing parts 453 may extend outward from an outer surface of the sensor bracket 45 to fix the working coil 42 mounted on the mounting bracket 43. Two coil fixing parts 453 may be disposed on each of upper and lower portions of the sensor bracket 45. Here, the coil fixing parts 453 may extend from both corners in a diagonal direction to press and fix the working coil 42.

The working coil 42 is disposed on a front surface of the mounting bracket 43. The working coil 42 generates magnetic force lines that cause heat generation of the hot water tank 41. When current is applied to the working coil 42, the magnetic force lines are generated in the working coil 42. The magnetic force lines may affect the hot water tank 41, and thus, the hot water tank 41 may be affected by the magnetic force lines to generate heat.

The working coil 42 is disposed on the front surface of the mounting bracket 43 to face one surface of both surfaces of the hot water tank 41, which has a flat shape. Also, the working coil 42 is provided as a plurality of strands of copper or other conductive wires, and the strands are insulated from each other. The working coil 42 generates magnetic fields or magnetic force lines by the current applied to the working coil 42.

Thus, the front surface of the hot water tank 41, which faces the working coil 42 may be affected by the magnetic force lines generated by the working coil 42 to generate heat. In the drawing, the strands of the working coil 42 are not shown in detail, and only the entire outline of the working coil 42 in which each of the strands is wound around the outside of the bracket mounting part 432 is shown.

The ferrite core 44 is disposed on the front surface of the working coil 42. The ferrite core 44 may suppress a loss of the current to function as a shield layer for the magnetic force lines. The working coil 42 may include a plurality of ferrite cores 44. The plurality of ferrite cores 44 may be radially disposed with respect to a central portion of the working coil 42.

The ferrite core 44 may be fixed to a core fixing part 433 of the mounting bracket 43. The ferrite core 44 may adhere to the core fixing part 433 or be press-fitted or combined with the core fixing part 433. The core fixing part 433 may be provided in plurality that are radially disposed like the ferrite cores 44.

Also, in the state in which the hot water tank 41 is mounted on the circumference of the mounting bracket 43, a coupling part 434 may be further provided so that an end of the hot water tank 41 is hung to be fixed. Thus, the working coil 42, the ferrite core 44, the sensor bracket 45, and the hot water tank 41 may be mounted on the mounting bracket 43 to form one module.

The hot water tank 41 is mounted on the front surface of the mounting bracket 43. The hot water tank 41 may be affected by the magnetic force lines generated by the working coil 42 to generate heat. Thus, the purified water is heated while passing through the inner space of the hot water tank 41 to generate hot water.

Also, the whole shape of the hot water tank 41 may be flat and compact. Also, the hot water tank 41 may be provided to correspond to the overall shape of the hot water module 40 so that the hot water tank 41 is effectively heated when the hot water module 40 is driven.

In detail, the hot water tank 41 may be provided by bonding a circumference of a first tank part 411 having a flat plate shape to a circumference of a plate-shaped second tank part 412 of which at least a portion of the hot water tank 41 is recessed to provide a passage. Also, an outlet tube 414 through which the heated water is discharged is provided in an upper end of the hot water tank 41, and an inlet tube 413 through which water to be heated is supplied is provided in a lower end of the hot water tank 41. Thus, while the water flows to be introduced into the inlet tube 413 and then discharged to the outlet tube 414, the hot water tank 41 may be instantly heated by the induced electromotive force generated by the working coil 42, and thus, the hot water may be discharged.

The first tank part 411 may have a flat surface facing the working coil 42 and be adjacent to the working coil 42 so that the entire surface of the first tank part 411 uniformly generates heat by the induced electromotive force generated by the working coil 42.

Also, a plurality of forming parts 412a may be provided in the second tank part 412. Each of the forming parts 412a may be recessed to the first tank part 411. When the first tank part 411 and the second tank part 412 are coupled to each other, the forming part may come into contact with an inner surface of the first tank part 411 to maintain a spaced space between the first tank part 411 and the second tank part 412. Thus, the first tank part 411 and the second tank part 412 may provide a space, through which water flows, by the forming parts 412a.

Also, the plurality of forming parts may be disposed adjacent to the inlet tube 413 and the outlet tube 414. Also, the plurality of forming parts 412a may be disposed to be spaced apart from each other in a width direction of the hot water tank 41. Thus, the water flowing through the inside of the hot water tank 41 may flow to be dispersed into the entire region within the hot water tank 41 so that the hot water tank 41 is effectively heated by the working coil. That is, the water flowing through the inside of the hot water tank 41 having a thin thickness and a wide area may be quickly heated by the working coil 42 at a temperature that is required for the discharging.

The controller 50 may be disposed at a rear side of the hot water module 40. The controller 50 may be connected to the hot water module 40, the flow rate sensor 14, the tank temperature sensor 451, the plurality of valves 12, 13, 17, 18, 20, and 240, and electronic components. The controller 50 may be provided in plurality. The plurality of controllers 50 may be divided into a portion for controlling the hot water module 40 and a portion except for the portion for controlling the hot water module 40.

For example, the controller 50 may include a control PCB 51, a control case 52, and a control cover 53. The control PCB 51 may be configured to control the driving of the hot water module 40 and be mounted on the control case 52. Also, the control PCB 51 may control the driving of the valves connected to the hot water module 40.

The control case 52 may accommodate the control PCB 51 therein and have an opened one surface that is covered by the control cover 53. Thus, the control PCB 51 may be maintained in the accommodated state by coupling the control case 52 to the control cover 53.

A shield plate 54 may be disposed on a front surface of the control cover 53. The shield plate 54 may prevent the magnetic force lines from being transmitted to the control PCB 51 when the hot water module 40 is driven and thus be disposed on the entire front surface of the control cover 53. The shield plate 54 may be molded in the form of a separate sheet and mounted on the front surface of the control cover 53.

In the water purifier having the above-described configuration, when hot water is generated, heat may be generated in the control PCB 51 of the controller 50 for controlling the working coil 42. Thus, to solve the heat generation, heat dissipation measures have to essentially provided.

According to the related art, a heatsink including a plurality of heatsink fins may be installed in the controller 50, or a blowing fan may be mounted around the controller 50 to perform heat dissipation using natural cooling or air cooling. However, it is difficult to except perfect heat dissipation through the above-described heat dissipation manner, and also, it is difficult to mount a separate heat dissipation unit inside the miniaturized water purifier. Also, there is a limitation that hot air remains in the water purifier or is discharged out of the water purifier. Also, there is a limitation that heat energy generated in the controller 50 is discarded into the atmosphere.

Particularly, in case of the existing induction heating (IH)-type water purifier, 2.5 kW of power is used to dispense hot water so that a first glass is maintained at a temperature between about 82° C. and about 85° C. Here, a power conversion device of the controller may adjust an output with respect to about 2.5 kW of power by using a water inlet temperature of the purified water introduced into the hot water tank and a water outlet temperature of the hot water discharged from the hot water tank. Here, the more the water inlet temperature decreases, the more a time taken to maintain the output of about 2.5 kW of the power conversion device increases. As described above, if the time taken to maintain the output of about 2.5 kW increases, various devices (for example, an IGBT, a diode bridge, and the like) of the power conversion device may increase in temperature. Thus, in order to protect the devices, an amount of water to be discharged may decrease.

That is, an amount of purified water may be adjusted so that the more the water inlet temperature of the purified water introduced into the hot water tank decreases, the more an amount of purified water introduced into the hot water tank decreases. As a result, an output of the hot water tank may be adjusted so that hot water having a temperature of about 82° C. to about 85° C. is discharged. Thus, the more the temperature of the introduced water decreases, the time taken to maintain about 2.5 kW of power in the hot water power conversion device increases. Here, the core components (for example, the diode ridge, the IGBT, and the like) of the hot water power conversion device may increase in temperature to limit an amount of water to be discharged.

Thus, in order to reduce the temperatures of the core components (for example, the diode ridge, the IGBT, and the like) of the power conversion device, a cooling system is required. However, due to a narrow space in the controller, it is difficult to install the cooling system. Thus, since the temperatures are lowered through the natural cooling, the hot water discharge amount and usage time may be limited. In addition, when the temperature of the water increases later, if the output increases by about 3.0 kW, the core components (for example, the diode ridge, the IGBT, and the like) may be limited in temperature, and thus, the amount of water to be discharged may be reduced.

According to an embodiment, to solve this phenomenon, the tube may be changed in structure so that at least a portion of the hot water tube 33 or the water discharge tube 30 passes through the controller 50. Thus, the raw water before being heated to generate hot water or the purified water may be heat-exchanged with the controller 50.

In detail, the tube may be changed in structure so that a portion of the tube between the water supply valve 13 and the hot water tank 41 passes through the controller 50.

As described above, when the portion of the water discharge tube 30 or the hot water tube 33 passes through the controller 50, the heat generation in the controller 50 may be securely solved. Also, heat energy generated in the controller 50 may be collected to preheat the raw water introduced into the hot water tank 41.

For example, at least a portion of the hot water tube 33 may be disposed to pass through the controller 50. Here, the raw water passing through the hot water tube 33 may be preheated while being heat-exchanged with the controller 50, and the preheated raw water may be heated after being introduced into the hot water tank 41 to generate hot water. Thus, energy efficiency of the hot water module 40 may be improved. Also, the heat of the controller 50 may be dissipated in a water cooling manner while being heat-exchanged as described above to surely secure the heat dissipation of the controller 50.

In this embodiment, at least a portion of the hot water tube 33 may come into direct contact with the controller 50 or come into indirect contact with the controller 50 by using a separate medium.

As described above, in the induction heating (IH)-type water purifier, in order to increase in temperature of the water to be discharged and flow rate of the water to be discharged, an output of an inverter is very important. In order to increase in temperature of water within a short time for which water is discharged, although an output of the inverter increases to be used, if the output of the inverter increases over about 3 kW, short circuit may occur, or energy efficiency class standards based on Ministry of Industry and Trade may not be obtained. The flow rate may be adjusted in the flow rate adjustment valve according to the temperature of the water introduced into the hot water tank and the temperature of the water discharged from the hot water tank, and the output of the inverter may be determined according to the temperatures of the introduced water and the discharged water. Although the temperature of the discharged hot water is determined according to the user's taste, the temperature of the introduced water may vary according to the season. Thus, the output of the inverter may vary according to the temperature of the introduced water. That is, the output of the inverter may be determined according to the temperature of the introduced water. Also, in the water cooling-type heat dissipation structure according to an embodiment, a temperature of the introduced water may primarily increases to reduce to the output of the inverter, and thus, an amount of water to be discharged may increase. Also, a difference in temperature of the water discharged from the hot water tank and the water introduced into the hot water tank may be reduced to reduce heat (the output of the inverter) heated in the inverter. As a result, the limitation in amount of hot water to be discharged due to the heat generation in the core components (for example, the diode ridge, the IGBT, and the like) of the power conversion device may be solved.

Hereinafter, the 'hot water tube' will be described in more detail.

In this embodiment, the hot water tube 33 includes a water inlet part 33a, a heat exchange part 33b connected to the water inlet part 33a and provided to pass through the controller 50, a connection part 33c connecting the heat exchange part 33b to the hot water tank 41, and a water outlet part 33d transferring hot water discharged from the hot water tank 41 to the water discharge nozzle 120.

Thus, the purified water introduced into the hot water tube 33 through the water inlet part 33a may flow to the heat exchange part 33b via the water inlet part 33a and absorb the heat energy generated in the controller 50 that comes into direct or indirect contact with the heat exchange part 33b while passing through the heat exchange part 33b and then be supplied to the hot water tank 41 through the connection part 33c.

A manipulation part (not shown) may be provided on an upper portion of the water purifier 10. Also, a plurality of buttons are provided on the manipulation part (not shown), and a user inputs various commands such as hot water generation are inputted through the manipulation part (not shown).

Also, the controller 50 may be connected to the manipulation part (not shown) to operate according to a user's command inputted through the manipulation part. For example, the controller 50 supplies current to the working coil 42 when a hot water generation command is inputted into the manipulation part. Here, a value of current supplied to the working coil 42 and an output of magnetic force of the working coil may be adjusted according to a hot water temperature inputted into the manipulation part. Also, the controller 50 may control the flow rate adjustment valve 20 to adjust an amount of purified water flowing through the hot water tank 41.

Thus, the controller 50 may be disposed in the upper portion of the water purifier 10, which is adjacent to the manipulation part. Also, the controller 50 needs to be disposed in the upper portion of the water purifier 10 so that water comes into contact with the controller 50 although various safety accidents such as water leakage occur.

In this embodiment, the controller 50 may be disposed in parallel to the hot water tank 41. Also, the controller 50 may be disposed above the hot water tank 41.

Figure 4:
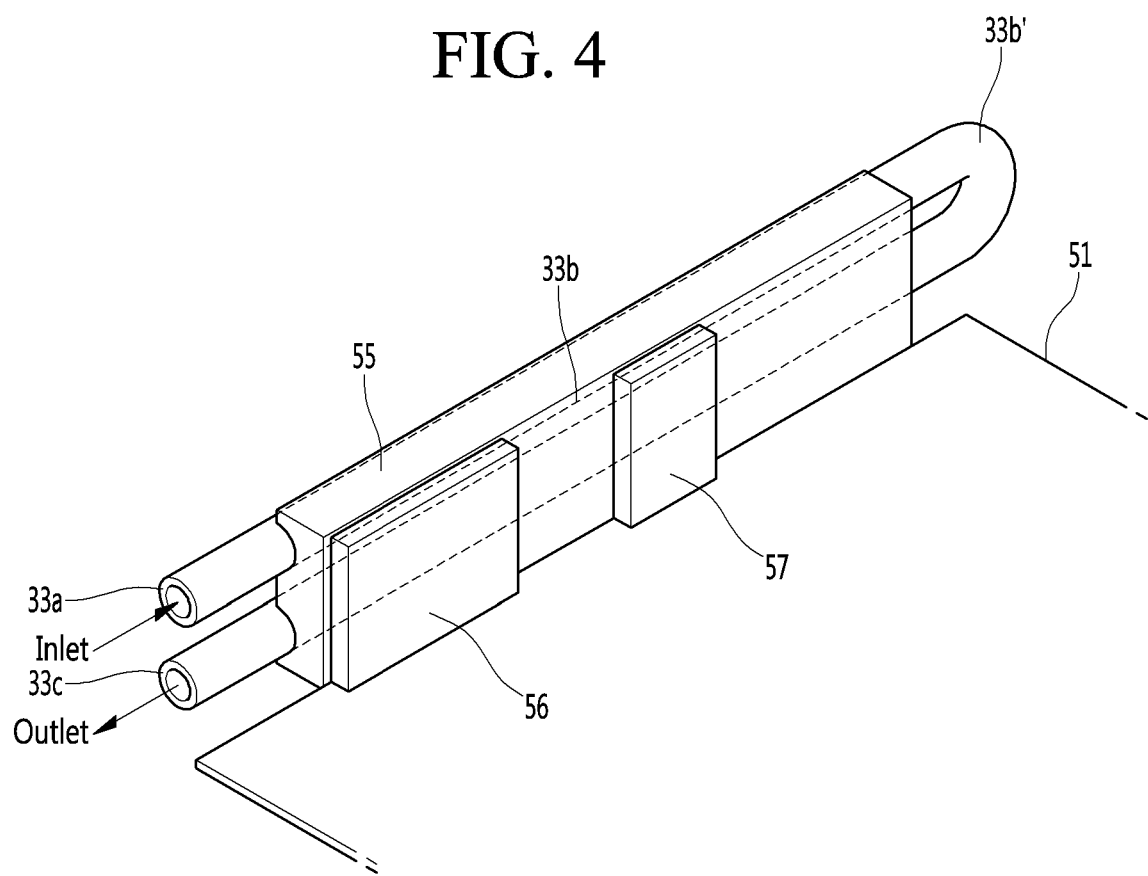
FIG. 4 is a view illustrating a coupling structure of a controller and a hot water tube.

FIG. 4 is a view illustrating a coupling structure of the controller and the hot water tube.

Referring to FIG. 4, the water inlet part 33a and the connection part 33c may be disposed to be spaced apart from each other in parallel to each other.

As described above, when the water inlet part 33a and the connection part 33c are disposed in parallel to each other, it may be advantageous in space utilization. Also, while the purified water flows from the water inlet part 33a to the connection part 33c, the purified water may be heat-exchanged with the controller 50 two times or more.

For this, at least a portion of the heat exchange part 33b has a bent shape so that the water introduced through the water inlet part 33a is discharged to the connection part 33c.

In detail, the heat exchange part 33b may include a bent section 33b' having a shape that is bent in an arch shape. The purified water passing through the heat exchange part 33b may be primarily heat-exchanged with the controller 50 while flowing from one side to the other side and then may pass through the bent section 33b'. Then, the purified water may be secondarily heat-exchanged with the controller 50 while flowing from the other side to one side.

For example, the bent section 33b' may have a 'U', '⊏' or 'V' shape. Also, the heat exchange part 33b may be bent in several times.

As described above, when the heat exchange part 33b has the bent shape, a flow path of the purified water passing through the heat exchange part 330b may be elongated, and thus, a time for the purified water, which is taken to pass through the heat exchange part 33b may increase, resulting in taking a larger amount of heat energy from the controller 50 to the purified water.

Also, when the heat exchange part 33b has the bent shape, a contact area with the controller 50 may increase to allow the purified water to more quickly take the heat energy from the controller 50.

As a result, when the heat exchange part 33b has the bent shape, the purified water passing through the heat exchange part 33b may be preheated because of quickly taking up a larger amount of heat energy from the controller 50, and thus, the controller 50 may quickly release a larger amount of heat energy to surely realize the heat dissipation thereof.

Also, an end of the connection part 33c may be connected to a lower portion of the hot water tank 41, and the water outlet part 33d may be connected to an upper portion of the hot water tank 41.

Since the raw water is heated in the hot water tank 41, the hot water having a relatively high temperature due to convection current is collected in an upper portion of the hot water tank 41, and the raw water having a relatively low temperature may be collected in a lower portion of the hot water tank 41.

In this state, when the connection part 33c is connected to the lower portion of the hot water tank 41, and the water outlet part 33d is connected to the upper portion of the hot water tank 41, only the high-temperature hot water heated in the hot water tank 41 may be discharged out of the hot water tank 41.

Figure 5:
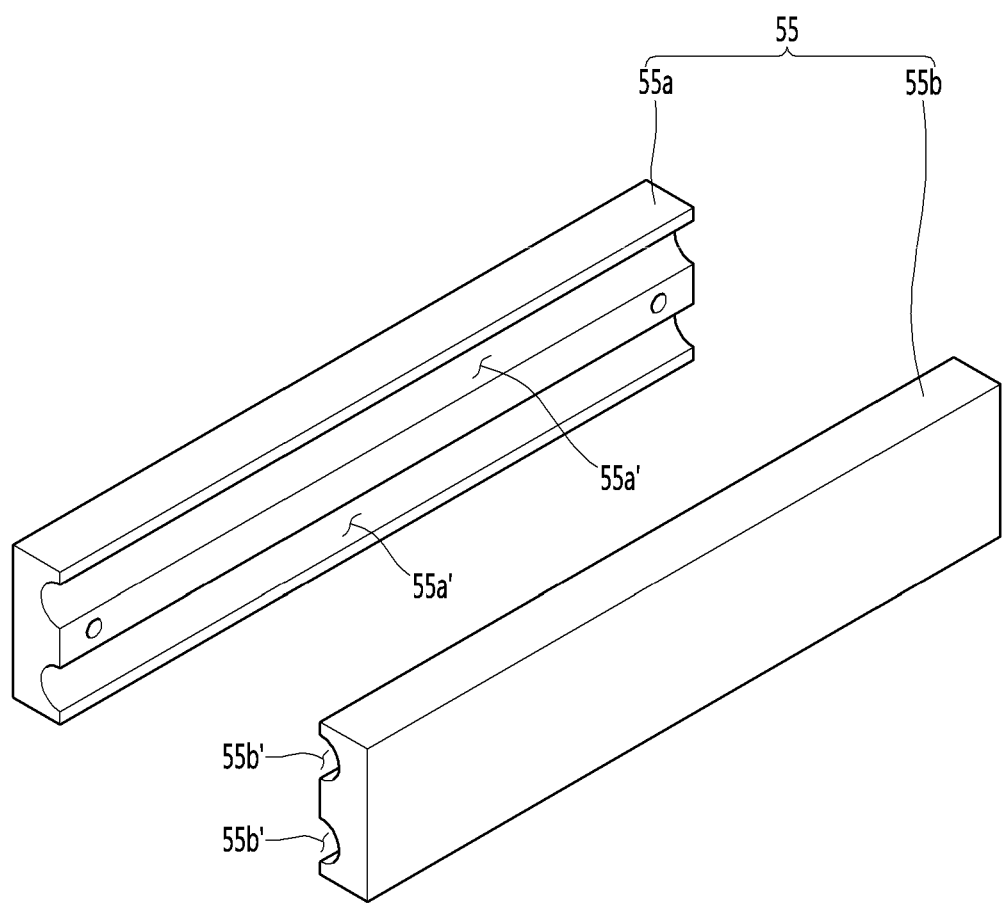
FIG. 5 is an exploded perspective view of a heat transfer member that is a portion of components according to an embodiment.

FIG. 5 is an exploded perspective view of a heat transfer member that is a portion of the components according to an embodiment.

Referring to FIGS. 4 and 5, the controller 50 may further include a heat transfer member 55 coming into surface contact with the heat exchange part 33b to transfer heat generated in various components 56 and 57 mounted on the control PCB 51 to the heat exchange part 33b.

For reference, the various components 56 and 57 mounted on the control PCB 51 may include at least one of an insulated gate bipolar transistor (IGBT) or a diode bridge. Here, a plurality of each of the components may be mounted on the control PCB 51 as necessary.

The heat transfer member 55 may be made of a material having high thermal conductivity. For example, the heat transfer member 55 may be made of an aluminum (Al) material. Also, at least a portion of the hot water tube 33 may be made of a stainless (SUS304) material.

Also, the heat transfer member 55 may be provided as a single body or a separably coupled assembly.

In the latter case, the heat transfer member 55 may include a first heat transfer member 55a having one surface coming into surface contact with the controller 50 and the other surface with an accommodation groove 55a' in which a portion of the heat exchange part 33b is accommodated and a second heat transfer member 55b having one surface with an accommodation groove 55b' in which the rest portion of the heat exchange part 33b is accommodated and coupled to the first heat transfer member 55a.

Here, the first heat transfer member 55a and the second transfer member 55b may be disposed symmetrical to each other. Thus, at least a portion of the heat exchange part 33b may pass through the insides of the first and second heat transfer members 55a and 55b.

Also, the first heat transfer member 55a and the second heat transfer member 55b may be coupled to each other through a separate coupling unit such as a bolt.

As described above, when the heat transfer member 55 is provided as the assembly, the heat transfer member 55 may be easily coupled to the heat exchange part 33b.

Also, an adhesion layer (not shown) that assists the heat exchange between the heat transfer member 55 and the various components 56 and 57 mounted on the controller 50 may be provided between the heat transfer member 55 and the various components 56 and 57.

The adhesion layer may be implemented in various manners according to various embodiments as long as the heat transfer member 55 adheres to the various components 56 and 57 mounted on the controller 56,57. For example, the adhesion layer may be provided in the form of a thin sheet made of a PET material.

Also, a separate adhesion layer that assists the heat exchange between the heat transfer member 55 and the heat exchange part 33b while improving adhesion force between the heat transfer member 55 and the heat exchange part 33b may be disposed between the heat transfer member 55 and the heat exchange part 33b.

For example, an adhesive may be applied between the accommodation grooves 55a' and 55b' of the heat transfer member 55 and the heat exchange part 33 to form an adhesion layer.

Thus, the heat transfer member 55 and the heat exchange part 33b may be maintained always in the contact state therebetween, and thus, the heat exchange therebetween may be more actively performed.

According to an embodiment, the heat dissipation of the controller 50 may be realized through the simple manner in which a portion of the water discharge tube 30 or the hot water tube 33 is disposed to pass through the controller 50, and the purified water supplied to the hot water tank 41 may be preheated.

Here, the purified water supplied to the hot water tank 41 may increase in temperature to reduce the output of the power conversion device for generating the hot water and also increase in amount of hot water to be discharged.

Also, the above-described effects may be obtained through the sample operation of changing a water inlet passage of the existing produced water purifier 10.

In detail, when a portion of the hot water tube 33 installed in the existing water purifier 10 is removed, and a portion of the hot water tube 33 is replaced to pass through the controller 50, the effect according to the present disclosure may be obtained.

Also, while the hot water tube 33 is assembled, when the heat transfer member 55 is fixed in such a manner in which the heat transfer member 55 is assembled with the heat exchange part 33b, and then the heat transfer member 55 adheres to the controller 50 through an adhesion manner, the hot water tube 33 may be simply fixed to the controller 50.

The hot water tube 33 or the hot water module 40 may include at least one of a first temperature sensor measuring a temperature of water introduced into the hot water tank 41, a second temperature sensor measuring a temperature of water accommodated in the hot water tank 41, and a third temperature sensor measuring a temperature of water discharged from the hot water tank 41.

Also, the temperature sensors may be connected to the controller 50.

Thus, the controller 50 may receive temperature information of the hot water, which are detected by the temperature sensors to control a value of current supplied to the working coil 42 or adjust an opened degree of the flow rate adjustment valve 20 according to the inputted temperature value.

For example, when the temperatures of the hot water, which are detected by the temperature sensors, are less than a preset target temperature, the value of the current supplied to the working coil 42 may increase, or the degree of opening of the flow rate adjustment valve 20 may decrease. That is, a flow rate of the purified water introduced into the hot water tank 41 may be reduced.

For another example, when the temperatures of the hot water, which are detected by the temperature sensors, are higher than the preset target temperature, the value of the current supplied to the working coil 42 may decrease, or the degree of opening of the flow rate adjustment valve 20 may increase. That is, a flow rate of the raw water introduced into the hot water tank 41 may increase.

For another example, when the temperatures of the hot water, which are detected by the temperature sensors, are equal to the preset target temperature, the value of the current supplied to the working coil 42 and the degree of opening of the flow rate adjustment valve 20 may be constantly maintained.

Figure 6:
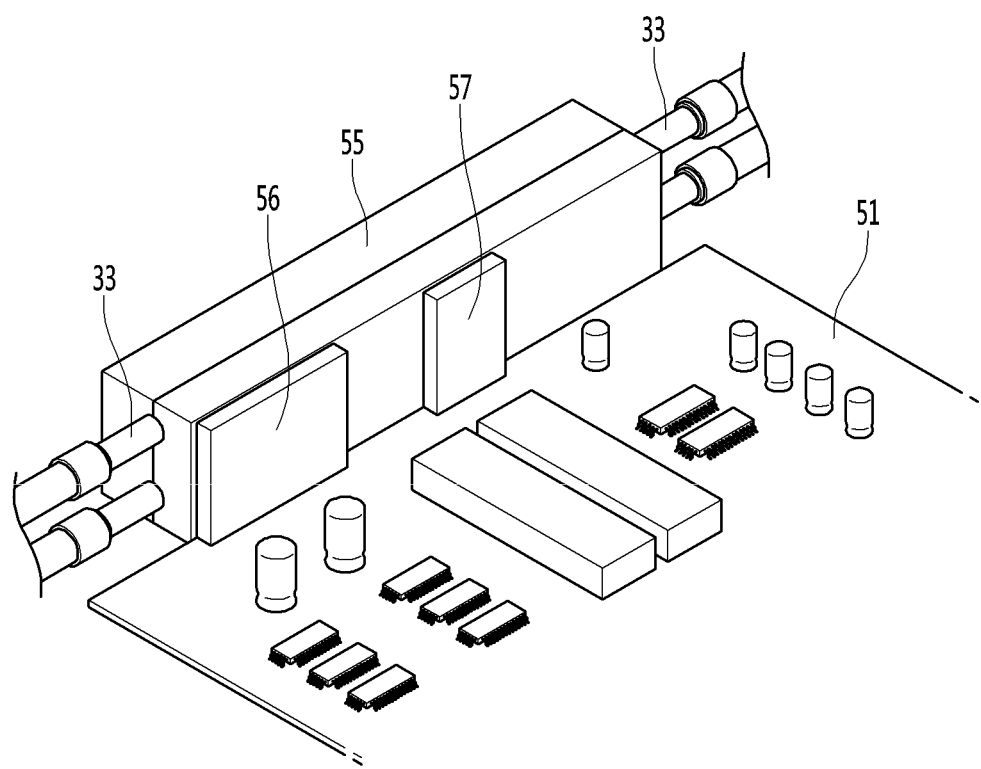
FIG. 6 is a view illustrating the inside of a controller according to an embodiment.

FIG. 6 is a view illustrating the inside of the controller according to an embodiment. Also, FIG. 7 is a view illustrating the inside of the controller according to the related art.

Referring to FIG. 6, according to an embodiment, the heat transfer member 55 may be attached to the heat generation components 56 and 57 mounted on the control PCB 51, and at least a portion of the hot water tube 33 may be disposed within the heat transfer member 55 to perform the cooling of the heat generation components 56 and 57 in the water cooling manner.

Figure 7:
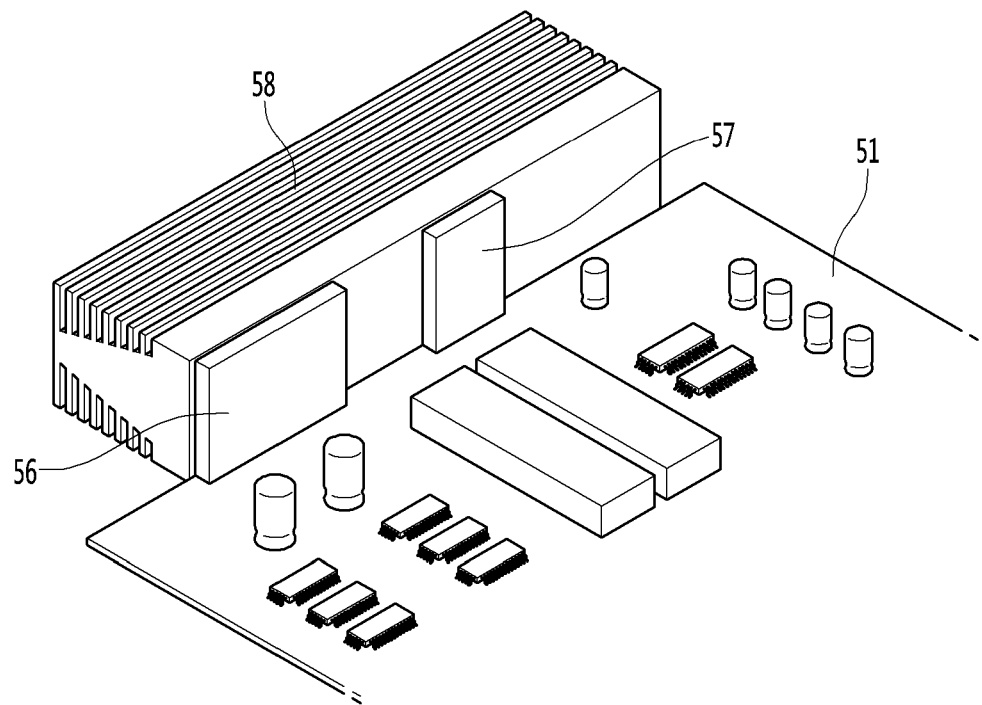
FIG. 7 is a view illustrating the inside of a controller according to the related art.

On the other hand, referring to FIG. 7, according to the related art, the heatsink 58 including the plurality of heatsink fins may be attached to the heat generation components 56 and 57 mounted on the control PCB 51 to perform the cooling of the heat generation components 56 and 57 in the natural cooling manner.

Figure 8:
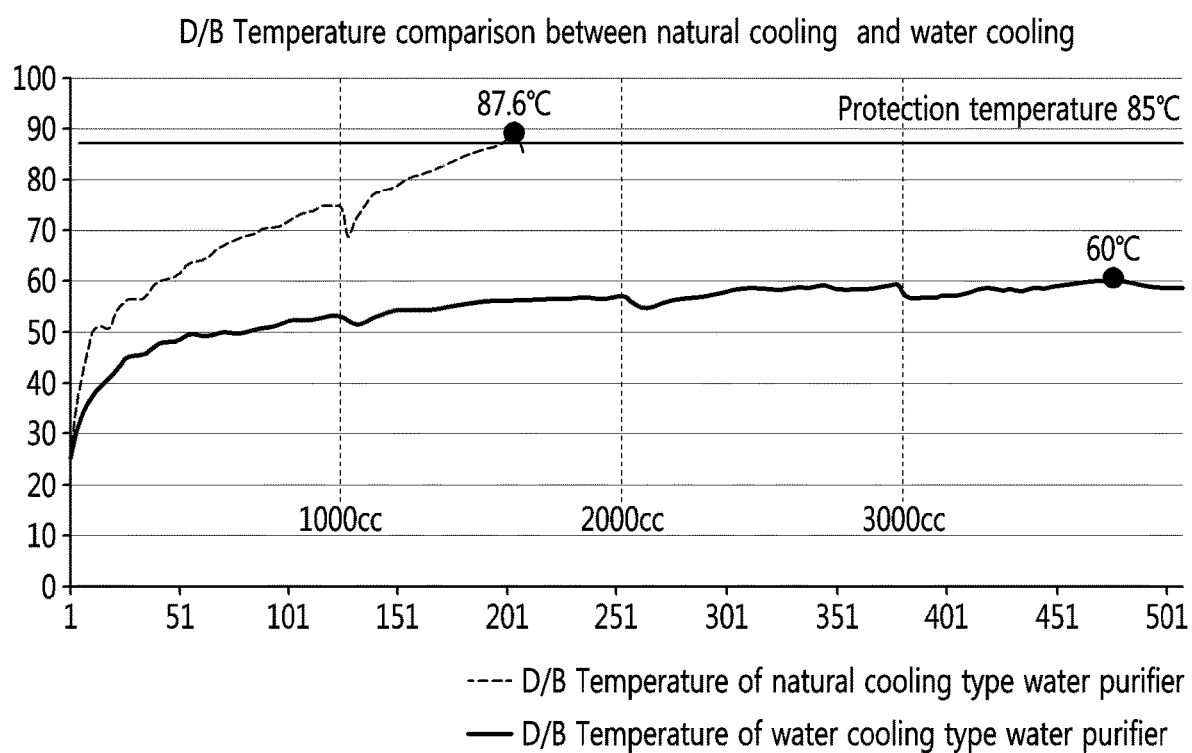
FIGS. 8 and 9 are graphs illustrating results obtained by measuring and comparing a variation in temperature in a natural cooling manner of FIG. 7 according to the related art and in a water cooling manner of FIG. 6 according to an embodiment.
Figure 9:
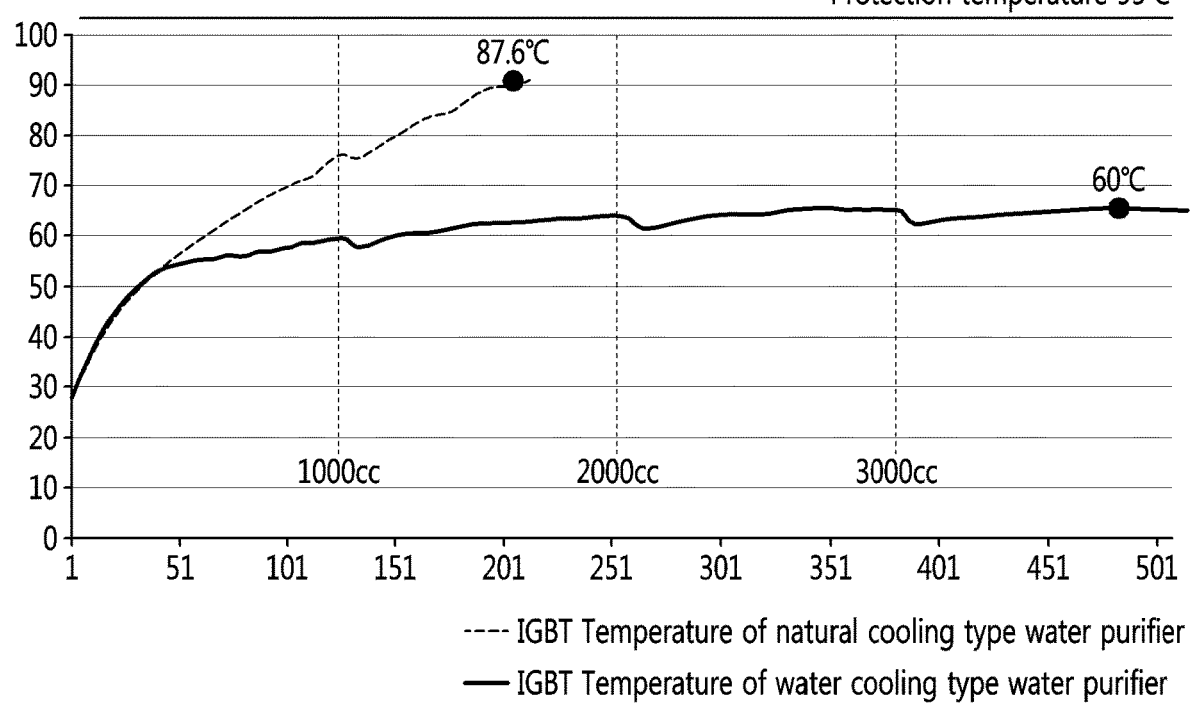

FIGS. 8 and 9 are graphs illustrating results obtained by measuring and comparing a variation in temperature in a natural cooling manner of FIG. 7 according to the related art and in a water cooling manner of FIG. 6 according to an embodiment.

Referring to FIGS. 8 and 9, when compared with the related art in which the heat generation components 56 and 57 are cooled by using the heatsink in the natural cooling manner as illustrated in FIG. 7, in case of this embodiment in which the heat generation components 56 and 57 are cooled in the water cooling manner as illustrated in FIG. 6, it is confirmed that the heat generation components 56 and 57 mounted on the control PCB 51 are maintained at a low temperature. That is, in the case of the water cooling manner, it may be confirmed that heat dissipation performance is improved.

In detail, referring to FIG. 8, in case of the diode bridge 56 mounted on the control PCB 51, when the diode bridge 56 is cooled in the water cooling manner, but not in the natural cooling manner using the heatsink, it may be confirmed that the heat dissipation performance is improved.

Also, referring to FIG. 9, in case of the insulated gate bipolar transistor (IGBT) 57 mounted on the control PCB 51 of the controller 50, when compared with the natural cooling manner using the heatsink, it may be confirmed that the temperature is maintained at a low value, and thus, the heat dissipation performance is improved.

The water purifier according to the embodiment may expect the following effects.

According to the embodiment, the heat generated in the controller may be dissipated through the simple manner in which the passage is disposed so that at least a portion of the raw water or the purified water before being introduced into the hot water tank passes through the controller, and the raw water supplied into the hot water tank may preheat the raw water.

Also, the raw water or the purifier water introduced into the hot water tank may be preheated to minimize a different between the water outlet temperature and the water inlet temperature with respect to the hot water tank, thereby efficiently generating the hot water.

Also, the heat generated in the controller may be easily dissipated through only the simple operation of changing the passage of the water purifier produced in the past, and the raw water supplied into the hot water tank may be preheated.

Also, the heat dissipation of the controller may be performed in the water cooling type to more surely dissipate the heat.

Also, the purified water introduced into the hot water tank may increase in temperature, the power consumption may be reduced, and an amount of hot water to be discharged may increase.

Also, since it is unnecessary to provide the separate heat dissipation unit such as the blowing fan, the space utilization may be advantageous, and thus, the space may be reduced to miniaturize the water purifier.

Also, since the heat generated in the controller remains in the water purifier or is not dissipated to the outside of the water purifier, the safety accident may be prevented.

Also, since the heat generated in the controller is not discarded into the atmosphere, but is used to preheat the raw water, it may be advantageous in view of energy efficiency.

Also, the controller may be disposed closer to the manipulation part disposed thereabove to minimize the wiring and easily respond to safety accident such as the leakage of water.

Also, the controller may be prevented from increasing in temperature and thus from being damaged. In addition, the driving time of the controller may be not temporarily limited, but always operated to improve the efficiency of the controller.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A water purifier comprising:
   a water supply tube configured to receive water;
   a filter member configured to purify water received through the water supply tube;
   a water discharge tube configured to supply water having passed through the filter member to an outside of the water purifier;
   a hot water tube branched from the water discharge tube;
   a hot water module comprising:
      a hot water tank located at the hot water tube and configured to accommodate purified water having passed through the filter member, and
      a heat generation unit comprising a working coil configured to heat water in the hot water tank;
   a controller that is disposed between the hot water tank and the filter member, that is configured to control the heat generation unit, and that is spaced apart from the hot water tank or from the heat generation unit, the controller comprising:
      a control printed circuit board (PCB),
      a heat generation component comprising at least one of an insulated gate bipolar transistor (IGBT) or a diode bridge that is vertically mounted on an end of the control PCB, and
      a heat transfer member that is in contact with the heat generation component, the heat transfer member having a first surface that is in surface contact with an outer surface of the controller; and
   a water discharge nozzle configured to supply, to the outside of the water purifier, water having passed through the water discharge tube or the hot water tube,
   wherein at least a portion of the hot water tube contacts the heat transfer member of the controller, and is configured to exchange heat with the heat generation component of the controller, and
   wherein the heat generation component is configured to generate preheated water having a first temperature by exchanging heat with the purified water passing through the hot water tube, and the hot water tank is configured to receive and heat the preheated water to generate hot water having a second temperature greater than the first temperature.

2. The water purifier according to claim 1, wherein the hot water tube comprises:
   a water inlet part branched from the water discharge tube and configured to receive purified water;
   a heat exchange part connected to the water inlet part and configured to pass through the controller;
   a connection part that connects the heat exchange part to the hot water tank; and
   a water outlet part configured to transfer hot water from the hot water tank to the water discharge nozzle.

3. The water purifier according to claim 2, wherein the water inlet part and the connection part are spaced apart from each other and arranged parallel to each other.

4. The water purifier according to claim 3, wherein the heat exchange part comprises a bent section that has an arch shape, and
   wherein the heat exchange part is configured to exchange heat with the controller based on purified water flowing from the water inlet part to the bent section and based on purified water flowing from the bent section to the water outlet part.

5. The water purifier according to claim 2, wherein the heat transfer member contacts the heat exchange part, and is configured to transfer heat from the controller to the heat exchange part.

6. The water purifier according to claim 5, wherein the heat transfer member comprises:
   a first heat transfer member having the first surface and a second surface that defines a first accommodation groove configured to accommodate a first portion of the heat exchange part; and
   a second heat transfer member configured to couple to the first heat transfer member, the second heat transfer member having a surface that is configured to face the second surface of the first heat transfer member and that defines a second accommodation groove configured to accommodate a second portion of the heat exchange part.

7. The water purifier according to claim 5, further comprising an adhesion layer located between the heat transfer member and the controller.

8. The water purifier according to claim 1, wherein the controller is located upstream of the hot water tank and downstream of the filter member.

9. The water purifier according to claim 2, further comprising at least one of:
   a flow rate sensor located at the water inlet part and configured to detect a flow rate of purified water supplied into the hot water tank, or
   a flow rate adjustment valve located at the water inlet part and configured to adjust the flow rate of purified water supplied into the hot water tank.

10. The water purifier according to claim 2, further comprising a hot water discharge valve located at the water outlet part and configured to restrict flow of hot water discharged from the hot water tank.

11. The water purifier according to claim 2, wherein the hot water tank comprises a lower portion connected to the connection part, and an upper portion connected to the water outlet part.

12. The water purifier according to claim 2, further comprising:
- a steam passage configured to discharge steam generated in the hot water tank, the steam passage being connected to the hot water tank or the water outlet part; and
- a safety valve located at the steam passage and configured to open the steam passage based on a pressure of steam being greater than a preset pressure.

13. The water purifier according to claim 1, further comprising:
- a cold water tube branched from the water discharge tube and configured to receive purified water from the water discharge tube;
- a cold water tank located at the cold water tube and configured to accommodate purified water received from the cold water tube; and
- a cooling unit configured to cool purified water accommodated in the cold water tank.

14. The water purifier according to claim 13, wherein the cold water tube joins the water discharge tube, and connects to the water discharge nozzle.

15. The water purifier according to claim 1, further comprising at least one of:
- a first temperature sensor configured to measure a temperature of water introduced into the hot water tank;
- a second temperature sensor configured to measure a temperature of water accommodated in the hot water tank, or
- a third temperature sensor configured to measure a temperature of water discharged from the hot water tank.

16. The water purifier according to claim 14, further comprising:
- a T-connector that connects the cold water tube and the water discharge tube; and
- a supply hose that connects the T-connector to the water discharge nozzle.

17. The water purifier according to claim 16, wherein the water discharge nozzle is configured to discharge one of hot water from the hot water tank, cold water from the cold water tank, or purified water through the filter member.

18. The water purifier according to claim 1, further comprising a shield plate located between the controller and the hot water module and configured to block transmission of magnetic field from the hot water module to the controller.

19. The water purifier according to claim 4, wherein the water inlet part and the water outlet part are located at a first side of the controller, and the bent section is located at a second side of the controller.

20. The water purifier according to claim 1, wherein the heat transfer member has an inner surface that defines an accommodation groove and that contacts an outer circumferential surface of the hot water tube.

* * * * *